(12) United States Patent
Obama et al.

(10) Patent No.: US 6,175,235 B1
(45) Date of Patent: Jan. 16, 2001

(54) THICKNESS DETECTING CALIPER FOR SHEET MATERIAL HAVING ELASTIC ARMS WITH PRINTED COILS

(75) Inventors: Masao Obama, Yokosuka; Tadashi Tsukahara, Yokohama, both of (JP)

(73) Assignee: Kabushiki Kaisha Toshiba, Tokyo (JP)

( * ) Notice: Under 35 U.S.C. 154(b), the term of this patent shall be extended for 0 days.

(21) Appl. No.: 09/152,276

(22) Filed: Sep. 14, 1998

(30) Foreign Application Priority Data

Sep. 30, 1997 (JP) .................................... 9-267350

(51) Int. Cl.[7] .................................................. G01B 7/06
(52) U.S. Cl. .................... 324/229; 324/231; 33/501.03
(58) Field of Search .................... 324/229, 228, 324/230, 231, 236; 33/147, 501.02, 501.03, 504, 556, 557, 558, 558.01, 559, 560, 561.2

(56) References Cited

U.S. PATENT DOCUMENTS 4,107,606 * 8/1978 Typpo et al. .................... 324/229
4,107,847 * 8/1978 Typpo et al. .................... 33/147 L

FOREIGN PATENT DOCUMENTS 9-46809    2/1997  (JP) .

* cited by examiner

*Primary Examiner*—Jay Patidar
*Assistant Examiner*—Henry S. Andersen
(74) *Attorney, Agent, or Firm*—Pillsbury Madison & Sutro LLP

(57) ABSTRACT

A pair of elastic strips are provided in order to hold sheet material to be measured in thickness. Each of the elastic strips includes of one or more elastic films. Ends of the elastic strips are supported by support portions, and the other ends of the elastic strips are provided with respective coils, opposed to push each other, and kept in contact with each other. When the sheet material is held between support portions, the inductances of the coils are changed and the thickness of the sheet material is detected as an electric signal representative of the changed inductance.

19 Claims, 5 Drawing Sheets

THICKNESS DETECTING CALIPER FOR SHEET MATERIAL HAVING ELASTIC ARMS WITH PRINTED COILS

BACKGROUND OF THE INVENTION

The present invention relates to a thickness detector for detecting a thickness of a paper sheet or the like.

In a conventional thickness detector using a belt to convey a paper sheet a roller having a fixed shaft and a movable roller having a support structure are used. These rollers are movable vertically and are paired in opposition to each other. When a paper sheet or the like passes between the pair of rollers, a displacement amount of the movable roller is detected as a thickness of the object. In this case, a plurality of pairs of rollers are disposed to measure a thickness distribution of the object in the direction perpendicular to the conveyance direction of the object.

In a conventional apparatus using another detection method, optical range-meters are provided at predetermined intervals above and below an object to be measured, opposed to each other. The distance to the object is measured by each of the optical range-meters, to detect the thickness thereof.

In the above-described method of detecting a thickness by a displacement of a roller, the roller has a certain weight, and therefore, a paper sheet or the like sometimes jams into the roller. Also, this method achieves only a low response ability to a rapid change caused when the top end of an object running enters into between rollers, when the rear end of the object comes out from between the rollers, or when a surface onto which a tape is adhered passes. Therefore, the detection speed is limited. Consequently, there has been a demand for a detector capable of detecting the thickness of an object being conveyed at a high speed with high accuracy.

In case of detecting a thickness distribution in the widthwise direction by disposing pairs of rollers, the rollers cannot be provided tightly due to roller support members and the like. It is therefore difficult to raise the resolution in the widthwise direction. Further, there is a problem that a swing of an object may be measured as displacement of the roller so that the detection accuracy is deteriorated when an object swings in the thickness direction while running. From the view point of manufacture, the manufacturing cost is high since the processing accuracy of the rollers and roller support members must be raised to reduce rattling during rotation of the rollers.

In the above-described method of detecting a thickness using optical range-meters, the amount of reflection light changes depending on the coloring of an object to be measured, and therefore, errors are included in the thickness measurement results. An optical range-meter which is not influenced by the coloring of an object is expensive, and has a large outer size which restricts the space where the range finder can be installed. Therefore, there has been a demand for a low priced thickness detector, which is not influenced by the coloring of an object to be measured and which does not occupy a large installation space.

BRIEF SUMMARY OF THE INVENTION

The present invention therefore has an object of providing a thickness detector which achieves a high response ability to a rapid change of the thickness of an object to be measured and is capable of detecting the thickness of a paper sheet or the like running at a high speed.

The present invention has another object of providing a thickness detector in which a plurality of thickness detecting portions are provided to be close to each other in the widthwise direction of an object to be measured.

The present invention has another object of providing a thickness detector which is not influenced by a swing of an object to be measured, in the thickness direction of the object.

The present invention has yet another object of providing a thickness detector at a low price, which is not influenced by coloring of an object to be measure.

In order to achieve the above objects, according to an aspect of the present invention, there is provided a thickness detector comprising: a pair of elastic members opposed to each other so as to hold an object to be measured, and having top end portions which are brought into contact with both surfaces of the object, the top end portions being provided with coil, respectively; and measurement means for measuring a clearance between the top end portions of the pair of elastic members, as a thickness of the object, by using inductances of the coils respectively provided for the elastic members.

Each of the elastic members is constituted by two or more elastic films adhered to each other by an adhesive member which functions as a damping material. Each of the coils of the elastic members consists of printed coils provided respectively on both sides of one of the elastic films and connected to each other by a through-hole.

The mass of the top end portions of the elastic members which detect the thickness of an object to be measured is small, and a damping member is provided in each of the elastic members. It is therefore possible to provide a thickness detector which has an excellent response ability to a rapid change in the thickness of the object to be measured, is capable of detecting the thickness of a paper sheet or the like running at a high speed, and is not influenced by the switch of the object in the thickness direction thereof.

The coils provided at the top end portions of the elastic members are connected in series with each other, functioning as a detection coil, and the measurement means includes a bridge circuit consisting of a first resistor connected in series with the detection coil, a second resistor having a resistance equal to that of the first resistor, and a dummy coil connected in series with the second resistor and having an inductance which is equal to that of the detection coil. The measurement means further includes a differential amplifier having a first input connected to a connection point between the detection coil and the first resistor and a second input connected to a connection portion between the dummy coil and the second resistor, an oscillator for supplying a sine wave to the bridge circuit, and means for outputting a signal representing the thickness of the object, using an output of the differential amplifier. The measurement means is thus constituted by a simple electric circuit. It is therefore possible to provide a thickness detector at a low price, which is not influenced by coloring of an object to be measured.

A wear-resistance member is provided on a surface of each of the elastic members that is brought into contact with the object sliding thereon, and the wear-resistance member is made of ceramics or diamond like carbon film.

Since each of the elastic members can be easily constructed to have a small overall width, a plurality of pairs each consisting of the elastic members can be easily provided in a direction perpendicular to the conveyance direction in which the object to be measured is conveyed. It is therefore possible to provide a thickness detector capable of detecting a thickness distribution of an object in the widthwise direction thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, embodiments of the present invention will be explained with reference to the drawings.

Figure 1:
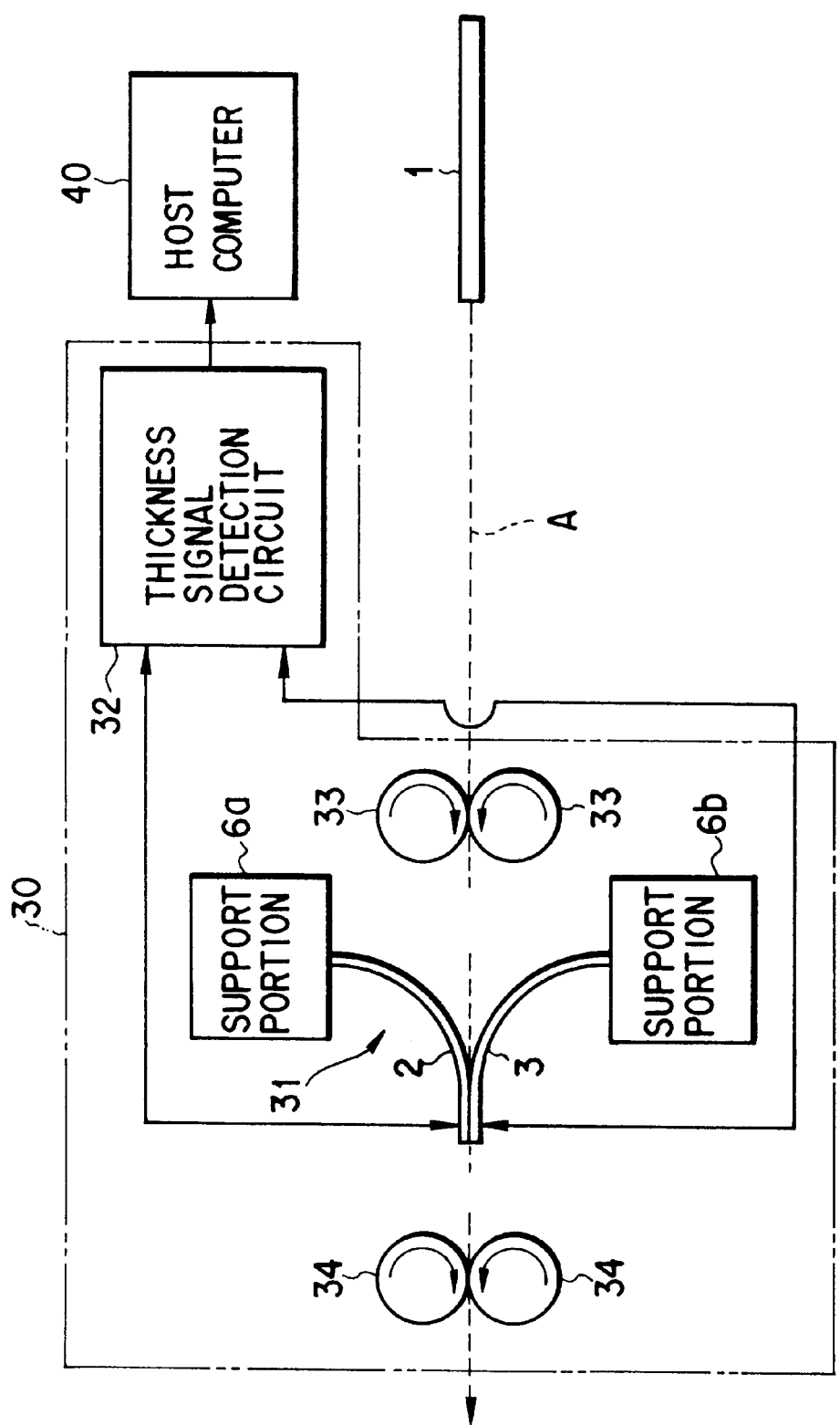
FIG. 1 is a view schematically showing the structure of a thickness detecting device according to the invention.

FIG. 1 shows the structure of a thickness detecting device 30 according to an embodiment of the present invention. The thickness detecting device 30 includes a thickness detector 31, a thickness signal detecting circuit 32 and feed rollers 33 and 34. The thickness signal detected by the thickness signal detecting circuit 32 is supplied to a host computer. The host computer 40 processes the thickness signal.

Figure 2:
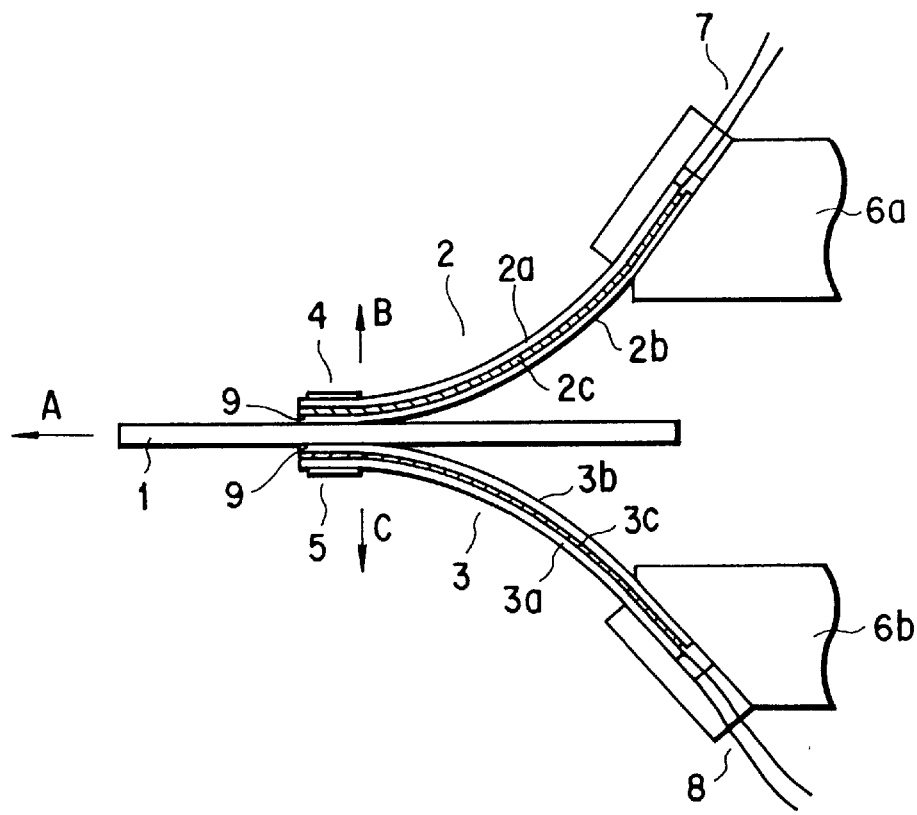
FIG. 2 is a view schematically showing the structure of a thickness detector according to an embodiment of the present invention.

FIG. 2 is a block diagram showing the thickness detector 31. An object 1 to be measured is a paper sheet such as a post card and is moved in the direction of the arrow A, held by a conveyer means such as a conveyer belt or the like not shown. Elastic members 2 and 3 are provided respectively in both sides of the object 1, with their ends fixed to support portions 6a and 6b. The other ends of the elastic members 2 and 3 are arranged so as to push each other, respectively kept in contact with both surfaces of the object 1. The surfaces of the elastic members 2 and 3 opposite to the surfaces thereof which are brought into contact with the object 1 are provided with coils 4 and 5, respectively. Leads 7 and 8 of the coils 4 and 5 are connected to a circuit which will be described later. The conveyer means for the object 1 may be conveyer rollers provided in the front and rear sides of the thickness detector.

Figure 3:
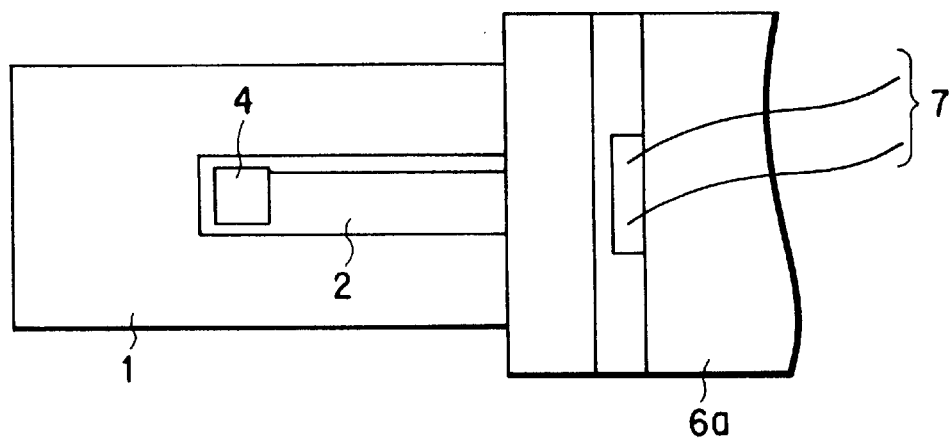
FIG. 3 is a plan view of a thickness detector.

FIG. 3 is a plan view showing the structure shown in FIG. 2. As shown in FIG. 3, the elastic member 2 has a narrow strip-like shape and has an end supported on the support portion 6a and another end including a portion (or to end portion) which is brought into contact with the object and which is provided with the coil 4. The elastic member 3 has the same structure as the elastic member 2 as shown in FIG. 3. The coil 4 provided at the top end portion of the elastic member 2 and the coil 5 provided at the top end portion of the elastic member 3 are opposed to each other.

In FIGS. 2 and 3, when the object 1 is not present, the elastic members 2 and 3 are in contact with each other, pushing each other. When an object 1 is moved in the direction of the arrow A and enters into between the elastic members 2 and 3, the elastic members 2 and 3 are respectively pushed and opened in the directions of the arrows B and C.

Figure 4:
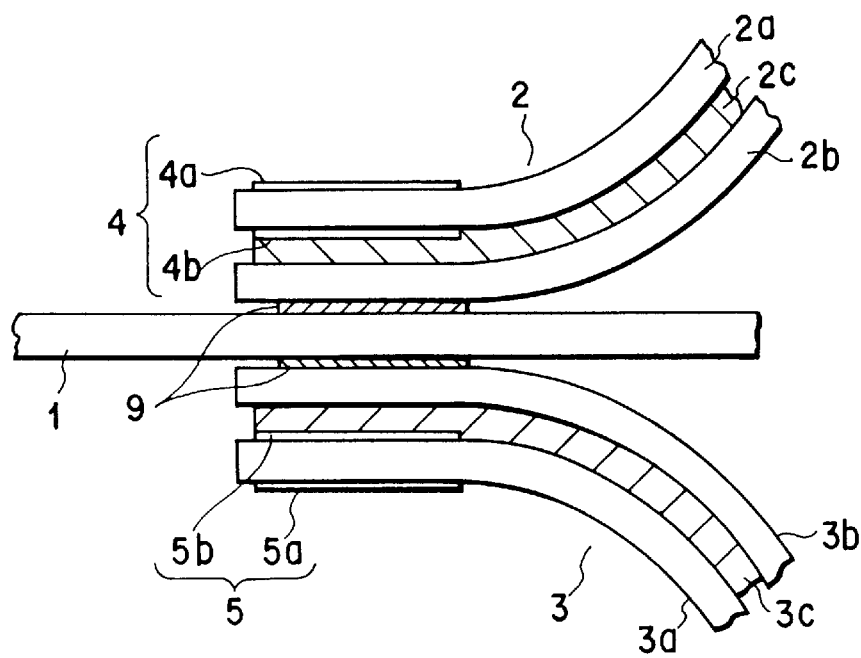
FIG. 4 is a view for explaining the structure of a main part of a thickness detector.

FIG. 4 shows the details of the elastic members 2 and 3. As shown in FIG. 4, the elastic member 2 is formed by integrating elastic films (such as polyimide films) 2a and 2b with each other by an adhesion 2c such as an adhesive double-coated tape or the like. The adhesion also serves as a damping material for damping vibrations of the elastic films 2a and 2b. Like the elastic member 2, the elastic member 3 is constructed by integrating the elastic films 3a and 3b with each other by an adhesion 3c. The coil 4 (consisting of 4a and 4b) and the coil 5 (consisting of 5a and 5b) are formed by printed coils provided on the elastic film 2a and the elastic film 3a, respectively. A wear-resistance member 9 serves to prevent the elastic members 2 and 3 from being worn due to sliding of an object 1 on the elastic films 2b and 3b. The wear-resistance member 9 is obtained by fixing a wear-resistance material onto the elastic films 2b and 3b by coating or the like, and is made of a DLC (Diamond-Like Carbon) thin film (having a thickness of 0.8μ, for example), a ceramics thin film, or the like. A DLC thin film is made of material which has a crystal lattice similar to that of diamond.

The wear-resistance member 9 also serves to prevent output signals from being changed as the clearance between the coils 4 and 5 is gradually reduced by wear of those portions of the elastic members 2 and 3 and the object 1 that are brought into contact with each other during sliding movement, or serves to prevent the coils 4 and 5 from being worn. As shown in FIG. 4, the wear-resistance members 9 are fixed to those portions of the elastic films 2b and 3b that are brought into direct contact with the object 1 to be measured, thereby to prevent wear of the elastic films 2b and 3b. According to experiments made by the present inventors, the elastic films were almost worn out after 300,000 sheets of papers passed as objects 1 to be measured where the elastic films 2b and 3b were polyimide films and no wear-resistance member 9 was provided. However, where DLC films were provided as the wear-resistance members 9, no wear was found even after 1,000,000 sheets of papers passed and the detector could be used for a long period.

Figure 5:
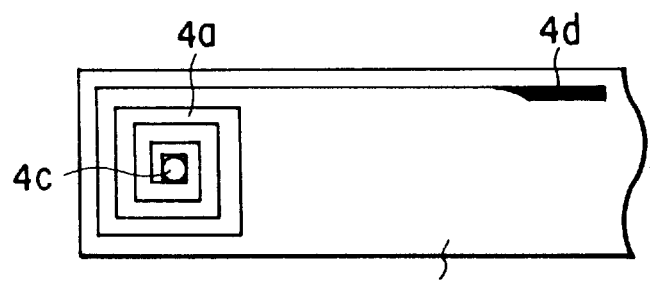
FIG. 5 is a plan view showing the structure of a coil in an elastic film.
Figure 6:
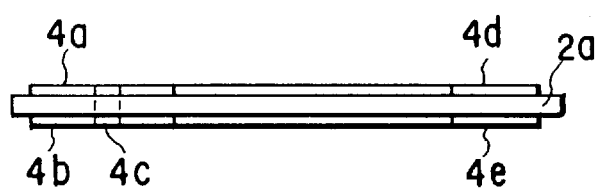
FIG. 6 is a view showing the structure of a coil in an elastic film.

FIGS. 5 and 6 show the structure of the coil 4. As shown in FIGS. 5 and 6, in the coil 4 (including 4a and 4b), for example, a coil 4a is formed of a conductive spiral printed wire at the top end portion of the elastic film 2a on the front surface thereof, and another coil 4b having the same coil direction is formed on the back surface of the top end portion of the elastic film 2a, like the front surface. Further, the coils 4a and 4b on the front and back surfaces are connected by a conductive through-hole member 4c. The coils 4a and 4b are connected with leads 7 and 8 by terminals 4d and 4e, respectively. Note that the coil 5 (including 5a and 5b) is constructed in the same structure as the coil 4 and is arranged to be opposed to the coil 4.

Figure 7:
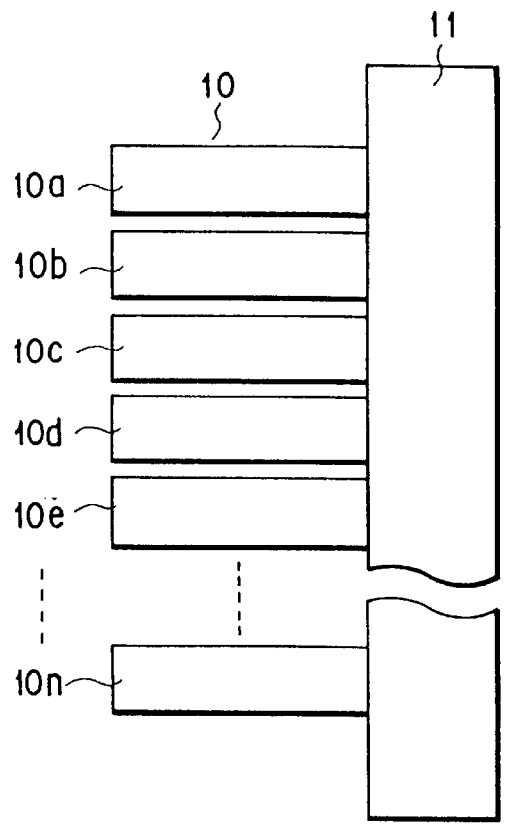
FIG. 7 is a view showing a modification example of a thickness detector.

FIG. 7 shows an embodiment in which a plurality of pairs each consisting of the elastic members 2 and 3 shown in FIG. 2 are disposed. As shown in FIG. 7, pairs 10a, 10b, 10c, . . . , 10n of elastic members are disposed in a direction (or widthwise direction) perpendicular to the conveyance direction of an object 1 to be measured, and each of the pairs detects the thickness of the object 1. By thus detecting the thickness of the object 1 in the widthwise direction, the distribution of the thickness of the object 1 is detected. If a plurality of pairs each consisting of the elastic members 2 and 3 are thus disposed in the widthwise direction of the object 1, the thickness distribution of the object 1 can be measured. In addition, the resolution of the thickness distribution can be raised by reducing the width of each elastic member and by increasing correspondingly the number of pairs of elastic members.

Figure 8:
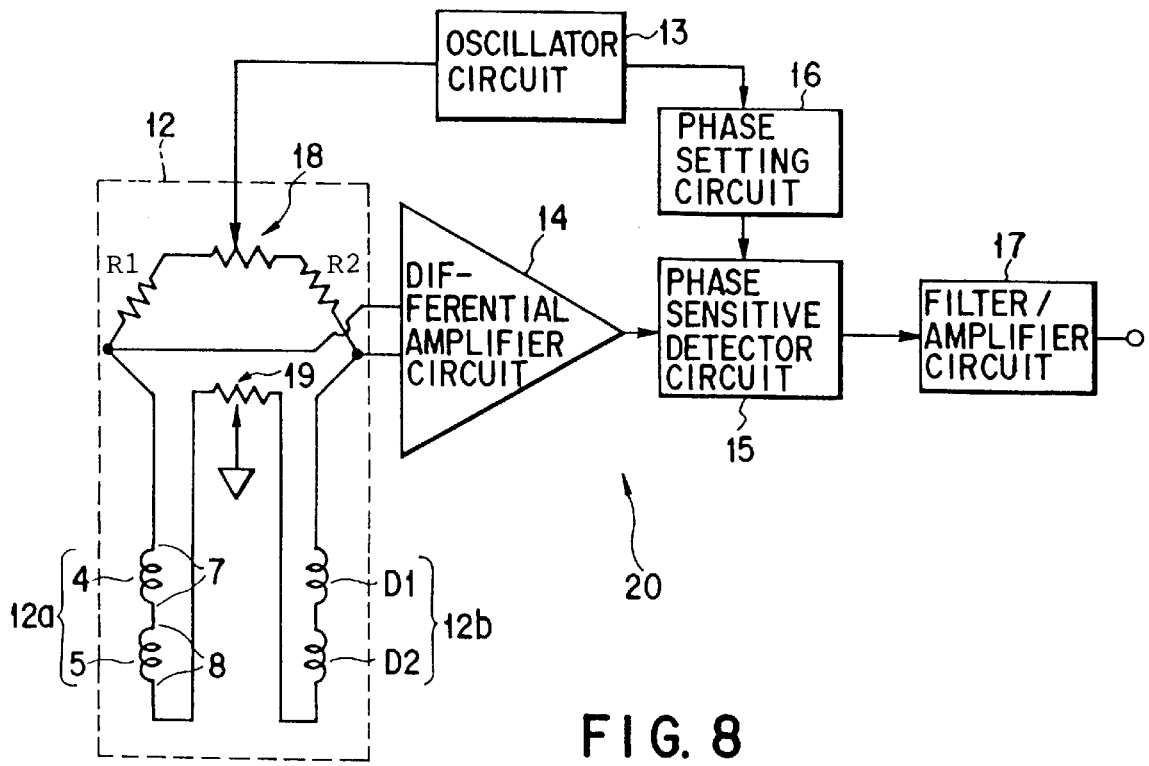
FIG. 8 is a block diagram showing a thickness signal detection circuit.

FIG. 8 shows a thickness signal detection circuit 20. A bridge circuit 12 includes two fixed resistors R1 and R2 having resistances equal to each other, a detection coil 12a constructed by connecting a coil 4 (including 4a and 4b) and a coil 5 (including 5a and 5b) in series with each other, a dummy coil 12b, and balance control resistors 18 and 19.

The dummy coil 12b is constructed by layering two printed coils D1 and D2 with a constant interval inserted therebetween, like the coils 4 and 5, and by connecting the coils D1 and D2 in series with each other. The inductance of the dummy coil 12b is substantially equal to the inductance of the detection coil 12a when the clearance between the elastic members 2 and 3 is zero, i.e., when no object is present between the elastic members 2 and 3. The dummy coil 12b is provided to reduce errors caused by a change of an output from the detection coil 12a due to an environmental change such as a temperature change or the like.

The balance control resistors 18 and 19 are resistors for making such an adjustment by which the difference between the impedance created by the resistor R1 and the detection coil 12a and the impedance created by the resistor R2 and the dummy coil 12b is reduced to zero. Therefore, the bridge circuit 12 is balanced by adjusting the balance control resistors 18 and 19.

An oscillation circuit 13 serves to supply a sine wave voltage to the bridge circuit 12. The sine wave voltage from the oscillation circuit 13 is divided by the resistor R1 and the detection coil 12a, and a divided voltage is supplied to one of inputs of a differential amplifier circuit 14. The sine wave voltage from the oscillation circuit 13 is also divided by the resistor R2 and the dummy coil 12b, and a divided voltage is inputted to the other one of the inputs of the differential amplifier circuit 14. That is, a differential voltage corresponding to an inductance change (which is a change in thickness of the object to be measured) is inputted to the differential amplifier circuit 14. A thickness signal output from the differential amplifier circuit 14 is supplied to a phase sensitive detector circuit 15. A phase setting circuit 16 is supplied with a sine wave voltage equal to that supplied to the bridge circuit 12 from the oscillation circuit 13 and sets the phase of the sine wave signal to a desired value, which is supplied to the phase sensitive detector circuit 15.

The phase sensitive detector circuit 15 performs wave-detection and rectification on a thickness signal concerning an object to be measured, from the differential amplifier circuit 14, under a phase condition that the sensitivity of the phase setting circuit 16 is high. That is, the phase sensitive detector circuit 15 extracts and rectifies a thickness signal concerning an object from a signal supplied from the differential amplifier circuit 14. Therefore, the output from the phase sensitive detector circuit 15 becomes a rectified pulsating current.

The output signal from the phase sensitive detector circuit 15 is supplied to a filter/amplifier 17. The filter/amplifier 17 amplifies the signal subjected to wave-detection and rectification by the phase sensitive detector circuit 15, and simultaneously reduces ripples, thereby to output an averaged value of thickness signals.

In the next, explanation will be made of operation of the thickness detector constructed in the structure as described above.

In FIGS. 2 and 3, when no object 1 to be measured is present, the elastic members 2 and 3 are in contact with each other, pushing each other. When an object 1 runs in the direction of the arrow A and enters into between the elastic members 2 and 3, the elastic members 2 and 3 are pushed and opened in the directions of the arrows B and C, so that the clearance between the coils 4 and 5 is enlarged.

In this time, if the object 1 swings and shifts in the direction of the arrow B, the elastic member 2 is pushed up and deformed by the object 1 and the elastic member 3 is deformed in the direction of the arrow B, following the object 1 due to its restoring force, so that the clearance between the coils 4 and 5 is not changed. When the object to be measured 1 is shifted in the direction of the arrow C, the elastic members 2 and 3 are accordingly deformed likewise. Therefore, the clearance between the coils 4 and 5 is not changed in relation to any swing of the object 1, so that the thickness detection signal is not changed.

In addition, when the top end of the object 1 enters into between the elastic members 2 and 3 or when the rear end thereof comes out from between the elastic members 2 and 3, the top ends of the elastic members 2 and 3 rapidly shift and vibrate. To reduce such vibrations, the elastic members 2 and 3 are constructed in a manner in which the elastic films 2a and 2b constituting the elastic member 2 are adhered to each other by an adhesive double-coated tape 2c as a damping member (or viscous material) and the elastic films 3a and 3b constituting the elastic member 3 are also adhered to each other by an adhesive double-coated tape 3c, as shown in FIG. 4. Damping effects are thus provided by the adhesive double-coated tapes 2c and 3c.

When the coils 4 and 5 are connected in series with each other, the inductance L will be as follows.

$$L = L1 + L2 + 2M$$

where L1 is an inductance of the coil 4,

L2 is an inductance of the coil 5, and

M is a mutual inductance between the coils 4 and 5.

The mutual inductance M is positive when the direction of the magnetic fields generated by the coils 4 and 5 are oriented in one same direction. The mutual inductance M is negative when the direction of the magnetic fields are oriented in opposite directions. If the clearance between the coils 4 and 5 changes, the mutual inductance M changes so that the serial inductance L of the coils changes. Therefore, the balanced condition of the bridge circuit 12 is broken thereby changing the output wave of the differential amplifier circuit 14, so that the output signal of the filter/amplifier circuit 17 changes. Further, the thickness of the object 1 to be measured is determined from the output signal of the filter/amplifier circuit 17, based on conditions such as a conveyance speed, a reference voltage, and the like.

Figure 9:
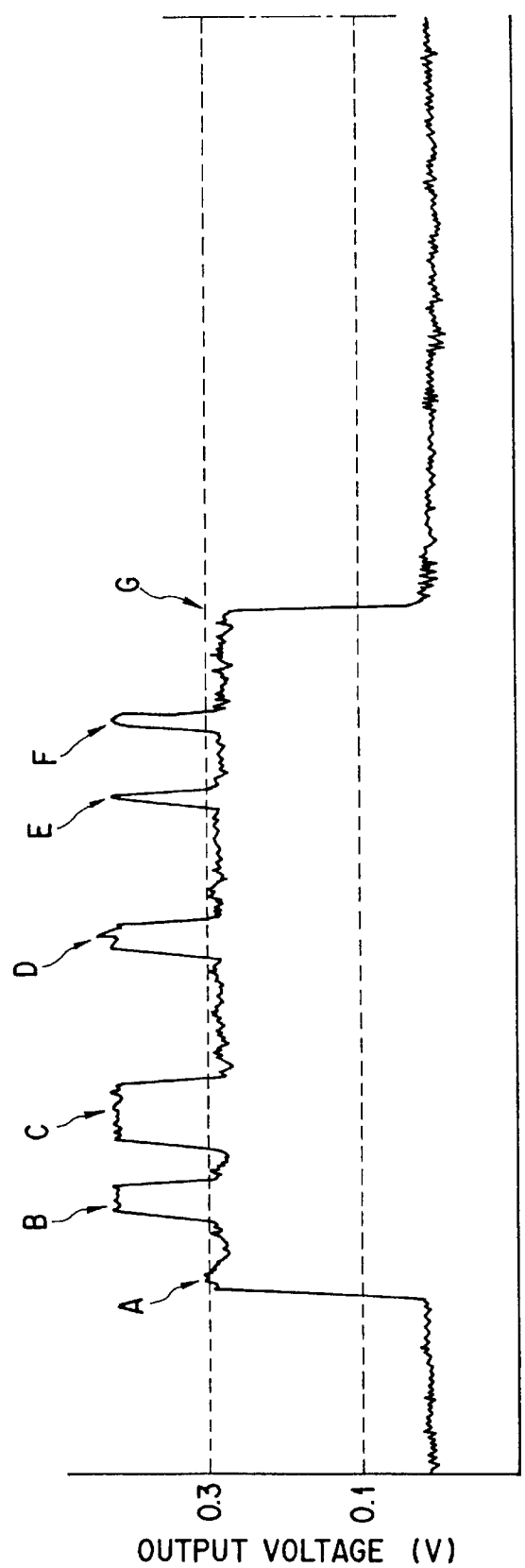
FIG. 9 is a view showing an output example of a thickness signal detection circuit.

FIG. 9 shows an example of an output signal from the thickness signal detection circuit 20. This example was obtained as a result of detection made when a paper piece having a thickness of 80 $\mu$m to which cellophane tapes having a thickness of 60 μm were intermittently adhered was conveyed at a running speed of 9 m/s, as an object to be measured. In FIG. 9, the range from the portion A to the portion G indicates the length of the paper piece, and the portions B, C, D, E, and F indicate waveforms where the cellophane tapes are adhered. In this case, the cellophane tapes adhered have a width of 18 mm at each of the portions B and D, a width of 40 mm at the portion C, a width of 3 mm at the portion E, and a width of 5 mm at the portion F. Thus, changes of the thickness of the paper piece running at a high speed (9 m/s) with cellophane tapes adhered thereto could be clearly detected with an excellent response ability.

In case where the thickness of the object 1 to be detected is predetermined, a reference voltage (of 0.3V, for example) may be set, as indicated by an upper broken line in FIG. 9, and it may be determined that the thickness of the object 1 is greater than the predetermined thickness if a value greater than the reference voltage is outputted. Otherwise, as indicated by a lower broken line in the figure, it may be determined that the thickness of the object 1 is smaller than a predetermined thickness if a value smaller than another reference voltage (or 0.1V, for example) is outputted.

As described above, the thickness detector according to the present invention, elastic members each consisting of a strip-like elastic film or a plurality of strip-like elastic films are provided so as to sandwich an object to be measured. An end of each film is fixed, and the other end of each film is in contact with an end of an opposite one of the films, such that the ends in contact push each other. The clearance created when a paper sheet or the like is let pass through such a contact portion is detected as a change of an electric signal by a detection coil provided for each elastic member such that each detection coil does not have a direct contact with the object 1.

In this manner, it is possible to achieve an excellent response ability to a rapid change of thickness of an object to be measured, and it is possible to detect the thickness of a paper sheet or the like running at a high speed. In addition, detecting portions can be arranged close to each other, and it is possible to provide a thickness detector at a low price, which is not influenced by a swing of an object to be measured, in the thickness direction, or by coloring thereof.

Also, elastic films, adhesive double-coated tapes, and printed coils are used as components forming elastic members. One or a plurality of elastic films constituting the elastic member described above are adhered by an adhesive material, and the elastic film uses the adhesive material as a damping member for reducing a vibration caused by a rapid change of thickness of an object to be measured.

As a result of this, the elastic member has reduced mass and a restoring force, so that it is possible to respond to a rapid change of thickness at a high speed. Meanwhile, the damping member adhered to the elastic member restricts a vibration of the elastic member, so that the elastic member does not vibrate even when the thickness rapidly changes.

In addition, the coils are applied with sine wave voltages, and a change of the clearance between the coils caused by an object to be measured is detected as impedance changes of the coils. The coil is constituted by a printed coil provided on at least one of the elastic films forming the elastic member, and a wear-resistance thin film is adhered to the portion where an elastic member is opposed to and has a contact with another elastic member. As a result, it is possible to prevent the contact portions of the elastic members from being worn due to friction between the elastic members and an object to be measured, thereby changing the clearance between the coils, and the detection signal can be prevented from being changed thereby.

To detect a distribution of thickness in the widthwise direction, a plurality of pairs of elastic members are disposed in the widthwise direction of an object to be measured. In this case, the intervals between the pairs of elastic members can be reduced if the width of each coil is narrowed within a range which does not influence the detection ability so that the width of each elastic members is reduced accordingly, and if the pairs of elastic members are disposed at such intervals with which the pairs of elastic members are not brought into contact with each other in the widthwise direction. Therefore, those portions where thickness detection cannot be performed are reduced and the resolution can be raised.

In addition, each pair of elastic members are arranged to be opposed to each other, pushing each other. Therefore, when an object to be measured swings, each elastic member swings following the object, and the clearance created by the thickness of the object is kept unchanged, so that the thickness can be detected regardless of a swing of the object to be measured.

Further, detection is achieved by the fixed supporting and the restoring forces of the elastic members, and no rotatable portions are used. Therefore, the thickness detector receives no influences from "rattling". Since the manufacturing accuracy needs not be as high as required in the roller method, the thickness detector achieves a low price.

Since the thickness is detected by making a direct contact with an object to be measured, thickness detection does not receive influences from coloring of the object, unlike an optical method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A thickness detector comprising:
   first and second elastic strips, respective first end portions of each strip being fixedly supported and second end portions thereof being (i) arcuately disposed in biased opposition to each other and (ii) configured to detect a thickness of an object being conveyed therebetween, each second end portion having a coil attached thereto; and
   measurement means for measuring a clearance between the first and second end portions, the clearance being representative of the thickness of the object, the measuring detecting a mutual inductance between the coils.

2. A detector according to claim 1, wherein each of the elastic strips includes two or more elastic films adhered to each other by an adhesive member which functions as a damping material.

3. A detector according to claim 2, wherein each of the coils includes coil members provided respectively on both sides of one of the elastic films.

4. A detector according to claim 2, wherein each of the coils includes printed coils provided respectively on both sides of one of the elastic films.

5. A detector according to claim 2, wherein each of the coils includes printed coils provided respectively on both sides of one of the elastic films and connected to each other by a through-hole.

6. A detector according to claim 1, wherein the coils are connected in series with each other and cooperatively function as a detection coil, and wherein the measurement means includes:

a bridge circuit having a first resistor connected in series with the detection coil, a second resistor having a resistance equal to that of the first resistor, and a dummy coil connected in series with the second resistor and having an inductance which is equal to the inductance of the detection coil when the end portions of the elastic members contact with each other;

a differential amplifier having a first input connected to a connection portion between the detection coil and the first resistor, and a second input connected to a connection portion between the dummy coil and the second resistor;

an oscillator for supplying a sine wave to the bridge circuit; and means for outputting a signal representing the thickness of the object, using an output of the differential amplifier.

7. A detector according to claim 6, wherein the measurement means further includes a balance adjust resistor for adjusting a balance between an impedance created by the first resistor and the detection coil and an impedance created by the second resistor and the dummy coil.

8. A detector according to claim 1, wherein a wear-resistance member is provided on a surface of each of the elastic members that is brought into contact with the object sliding thereon.

9. A detector according to claim 8, wherein the wear-resistance member is made of ceramics.

10. A detector according to claim 8, wherein the wear-resistance member is a diamond-like carbon film.

11. A detector according to claim 1, wherein a plurality of pairs each including the first and second strips are provided in a direction perpendicular to a conveyance direction in which the object is conveyed.

12. A thickness detector for detecting a thickness of an object to be measured, which is conveyed along a conveyer path, comprising:

first and second elastic members each including double-coated tape having a damping function, first elastic film adhered onto first surface of the double-coated tape that is opposite to second surface thereof opposite to the first surface and facing the conveyer path, second elastic film adhered onto the second surface of the double-coated tape facing the conveyer path, wear-resistance member provided at end portion of the second elastic film on the surface thereof facing the conveyer path thereby to prevent wear caused by the object being conveyed along the conveyer path, and first and second coils provided on both surfaces of end portion of the first elastic film and connected in series with each other, the first and second elastic members having other ends fixed such that the end portions elastically push each other; and detection means for outputting a detection signal corresponding to the thickness of the object being conveyed, based on a serial inductance created by the first and second coils of the first elastic member and the first and second coils of the second elastic member.

13. A detector according to claim 12, wherein the coil of each of the elastic members includes printed coils provided respectively on both sides of the first elastic film.

14. A detector according to claim 12, wherein the coil of each of the elastic members includes printed coils provided respectively on both sides of the first elastic film and connected to each other by a through-hole.

15. A detector according to claim 12, wherein the coils provided at the top end portions of the elastic members are connected in series with each other, functioning as a detection coil, and the detection means includes:

a bridge circuit having a first resistor connected in series with the detection coil, a second resistor having a resistance equal to that of the first resistor, and a dummy coil connected in series with the second resistor and having an inductance which is equal to that of the detection coil when the end portions of the elastic members contact with each other;

a differential amplifier having a first input connected to a connection portion between the detection coil and the first resistor, and a second input connected to a connection portion between the dummy coil and the second resistor;

an oscillator for supplying a sine wave to the bridge circuit; and means for outputting a signal representing the thickness of the object, using an output of the differential amplifier.

16. A detector according to claim 15, wherein the detection means further includes a balance adjust resistor for adjusting a balance between an impedance created by the first resistor and the detection coil and an impedance created by the second resistor and the dummy coil.

17. A detector according to claim 12, wherein the wear-resistance members are made of ceramics.

18. A detector according to claim 12, wherein the wear-resistance members are diamond-like carbon films.

19. A detector according to claim 12, wherein a plurality of pairs each including the pair of elastic members are provided in a direction perpendicular to a conveyance direction in which the object is conveyed.

* * * * *